US006826409B2

(12) United States Patent
Kostic et al.

(10) Patent No.: US 6,826,409 B2
(45) Date of Patent: *Nov. 30, 2004

(54) METHOD AND APPARATUS FOR IMPLEMENTING MEASUREMENT BASED DYNAMIC FREQUENCY HOPPING IN WIRELESS COMMUNICATION SYSTEMS

(75) Inventors: Zoran Kostic, Tinton Falls, NJ (US); Nelson Ray Sollenberger, Tinton Falls, NJ (US)

(73) Assignee: AT&T Corp, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/366,379

(22) Filed: Feb. 14, 2003

(65) Prior Publication Data

US 2003/0119534 A1 Jun. 26, 2003

Related U.S. Application Data

(63) Continuation of application No. 09/312,279, filed on May 14, 1999, now Pat. No. 6,549,784
(60) Provisional application No. 60/114,080, filed on Dec. 28, 1998.

(51) Int. Cl.$^7$ .................. H04B 15/00; H04B 7/005; H04B 7/01; H04B 7/015
(52) U.S. Cl. .................. 455/501; 455/502; 455/525; 455/67.16; 455/63.1; 455/504; 375/130; 375/132; 370/203; 370/329; 370/260; 370/285
(58) Field of Search .................. 455/501, 502, 455/504, 513, 525, 67.1, 67.4, 62, 63, 67.16, 67.11, 63.1; 375/132, 130; 370/260, 285, 203, 329

(56) References Cited

U.S. PATENT DOCUMENTS 4,554,668 A * 11/1985 Deman et al. .................. 375/1
4,850,036 A * 7/1989 Smith .......................... 455/502

(List continued on next page.)

OTHER PUBLICATIONS

Rabiner and B.H. Juang, *Fundamentals of Speech Recognition*, Prentice Hall (1994).
Alshawi, H., Bangalor, S. and Douglas, S., *Learning Phrase–vbased Head Transduction Models for Translation of Spoken Utterances*, Proceedings of the International Conference on Spoken Language Processing, Sydney, Australia, 1998.

*Primary Examiner*—Marceau Milord

(57) ABSTRACT

Proposed is a method for reducing interference in a frequency hopping wireless communications system. In one embodiment of the present invention, a base station and a terminal station each using an orthogonal frequency division multiplexing (OFDM) technique to simultaneously measure an interference level for each system frequency and to enable high speed frequency hop pattern changes which can follow changes in desired and interfering signal levels due to changes in co-channel interference or shadow fading. The terminal station interference level measurement values are then transmitted to the base station. Next, the base station identifies each frequency hop pattern currently in use by each terminal station communicating with that base station. The base station then uses both the base station interference level measurements and the terminal station interference level measurements to identify each frequency hop pattern in which at least one of the current system frequencies should be replaced with a system frequency having a lower interference level. Next, the base station replaces no more than a predetermined number of the current system frequencies within the identified frequency hop pattern(s). The above steps are executed at each base station within the system while ensuring that nearby interfering base stations do not replace frequencies at the same time.

7 Claims, 6 Drawing Sheets

U.S. PATENT DOCUMENTS

| | | | |
|---|---|---|---|
| 5,121,408 A | * | 6/1992 | Cai et al. .................... 375/134 |
| 5,287,384 A | * | 2/1994 | Avery et al. .................. 375/1 |
| 5,323,447 A | | 6/1994 | Gillis et al. ................... 379/61 |
| 5,394,433 A | | 2/1995 | Bantz et al. ................. 375/202 |
| 5,425,051 A | * | 6/1995 | Mahany ...................... 375/202 |
| 5,859,841 A | * | 1/1999 | Gitlits ......................... 370/335 |
| 5,946,624 A | * | 8/1999 | Petranovich et al. ........ 455/447 |
| 6,005,884 A | * | 12/1999 | Cook et al. ................. 375/202 |
| 6,023,459 A | * | 2/2000 | Clark et al. ................. 370/329 |
| 6,047,023 A | * | 4/2000 | Arnstein ..................... 375/229 |
| 6,061,389 A | * | 5/2000 | Ishifuji et al. .............. 375/133 |
| 6,072,990 A | * | 6/2000 | Agrawal et al. .............. 455/69 |
| 6,128,328 A | * | 10/2000 | Schilling .................... 375/134 |
| 6,233,437 B1 | * | 5/2001 | Klenner ..................... 455/115 |
| 6,246,713 B1 | * | 6/2001 | Mattisson ................... 375/132 |
| 6,253,086 B1 | * | 6/2001 | Parantainen et al. ........ 455/446 |
| 6,272,353 B1 | * | 8/2001 | Dicker et al. ............... 455/517 |
| 6,275,518 B1 | * | 8/2001 | Takahashi et al. .......... 375/135 |

* cited by examiner

METHOD AND APPARATUS FOR IMPLEMENTING MEASUREMENT BASED DYNAMIC FREQUENCY HOPPING IN WIRELESS COMMUNICATION SYSTEMS

CROSS REFERENCES TO RELATED APPLICATIONS

This application is a continuation of U.S. application Ser. No. 09/312,279, filed May 14, 1999, which issued as U.S. Pat. No. 6,549,784 and which claims the benefit of U.S. Provisional Application Ser. No. 60/114,080, filed Dec. 28, 1998, each of which are incorporated herein by reference in their entireties.

BACKGROUND

The present invention is directed to frequency hopping wireless communications systems. More specifically, the present invention reduces interference levels and increases capacity in frequency hopping wireless communications systems by dynamically replacing system frequencies in use within selected frequency hop patterns with system frequencies having lower interference levels and by precluding nearby interfering system components (for example, base stations) from simultaneously making frequency replacements using the same available system frequencies.

The demand for wireless communications services continues to grow at an astonishing rate. For example, each day a greater percentage of the public elects untethered access to a telephone system using cellular telephones. Unlike traditional telephones with attached cords which limit the user's movement, cellular telephones allow users to make telephone calls while in transit between locations. In addition to wireless voice communication services, the public is discovering numerous instances where wireless data communication simplifies their lives. For example, an employee who has traveled on business away from a local area network (LAN) in the home office may use a laptop computer having a radio transceiver to establish a wireless connection to the LAN from within a hotel room. Once the wireless connection is established, the employee may check electronic mail or access other files on the LAN in the same manner these tasks might be performed from within the home office using a desktop computer wired to the LAN.

Unfortunately, the number of frequencies available to support the public's growing appetite for wireless communications services is limited. Thus, service providers must make the most efficient use of these frequencies to meet the growing demand. One method for increasing the efficiency of a wireless communication system entails avoiding the use of frequencies with high interference levels which might otherwise require that data be retransmitted thereby consuming additional system resources. Some of the current wireless communication systems implement some type of frequency hopping technique to reduce the system-wide impact of frequencies which are experiencing high interference levels. As explained below, however, the current methods for implementing frequency hopping techniques leave room for improvement.

Understanding the current methods for implementing frequency hopping techniques requires a basic understanding of how typical wireless communication systems transmit data and the major sources of interference within theses systems. In a typical wireless communication system, a transmitter modulates a carrier frequency with voice or data information and transmits the modulated carrier frequency through the air to a receiver. The receiver then demodulates the carrier frequency to obtain the included voice or data information. In some wireless systems, the receiver sends the transmitter a message which indicates whether the transmitted data was successfully received. Co-channel interference, multipath fading, and shadow fading are among the types of interference which may prevent the receiver from successfully receiving transmitted data.

Co-channel interference may result when two transmitters within range of each other attempt to transmit data to their respective receivers using the same carrier frequency at the same time. The greater the level of co-channel interference, the greater the chance the transmitted data will become too distorted for the receiver to process. System resources required to retransmit this data are unavailable to transmit newly arriving data. As a result, the flow of data through the system is slowed. As the number of users in a wireless system using the limited available number of frequencies continues to increase, the possibility that two or more transmitters may be located within range of each other and transmit data using the same frequency at the same time also increases. Co-channel interference is particularly relevant to the design and deployment of cellular wireless systems.

Multipath fading occurs when a transmitted signal is reflected by objects in the path between the transmitter and receiver. As a result of one or more reflections, multiple versions of the transmitted signal may arrive at the receiver at different times. The division of the transmitted signal into these multiple versions may cause the amplitude of the transmitted signal to fade at the receiver. If the level of fading is great enough, the strength of the signal arriving at the receiver may be too low for proper receiver processing and the signal may need to be retransmitted.

Shadow fading is caused by vehicles moving in and out from behind buildings, hills, and other obstructions. Shadow fading changes at a rate of about once per second.

Both co-channel interference and multipath fading are frequency dependent. For example, two in-range transmitters may transmit at the same time without interfering with each other if each transmitter uses a different frequency. With respect to multipath fading, some ranges of frequencies are more susceptible to fading than others when transmitted along the same path. Thus, some wireless communications systems constantly "hop" from one available carrier frequency to another available carrier frequency while transmitting data to avoid the prolonged use of a frequency which might be experiencing high interference levels. Current frequency hopping systems select frequencies at the time a call is initiated. Prior to hopping from one frequency to another, the transmitting device will usually send a message to the receiving device so the receiving device will anticipate receiving data on the new frequency. Depending on the wireless system, the pattern the transmitter follows while hopping among available frequency be preplanned, random, pseudo-random, or based upon dynamic frequency interference level measurements. Further, when a receiver switches from communicating with one transmitter to communicating with another transmitter, the frequency hop patterns will likely change.

Some frequency hopping wireless systems continually measure interference levels for selected system frequencies during system operation. These "dynamic" interference level measurements may be used to substitute frequencies experiencing high interference levels with frequencies having lower interference levels. For example, U.S. Pat. No. 5,323,447 to Mark E. Gillis et al describes a frequency hopping method in which a cordless telephone handset measures interference levels among a first group of frequencies within a frequency hop pattern while using the first group of frequencies to communicate with a base unit. When interference is detected on one of the frequencies in the first group, the base station replaces that frequency with a frequency (from a second group of frequencies) having a lower interference level. In another example, U.S. Pat. No. 5,394,433 to David F. Bantz et al, discloses a frequency hopping method in which the entire frequency hop pattern currently in use by a base station and a mobile station is replaced with a new frequency hop pattern from a predetermined set of patterns upon detecting frequencies with an unacceptable interference level within the current frequency hop pattern.

Unfortunately, current dynamic frequency hop management methods measure each system frequency sequentially. Due to the rate at which interference levels may be sequentially measured for each system frequency, these current frequency hop management methods also do not contemplate measuring all system frequencies at a rate near the rate at which the power of a received frequency signal fades while propagating through the transmission medium or the rate at which co-channel interference charges. The medium through which a frequency signal is transmitted influences the strength of the signal at the receiver. The Rayleigh fading rate is typically used to describe the statistical time varying nature of frequency signals transmitted; through the air. Although the Rayleigh fading rate covers a range of rates, a fading rate of 100 Hz (which translates to a period of approximately 10 ms) is typically used to describe the rate at which the power of a received frequency signal varies while propagating through the air. Current frequency hop management methods are only able to measure interference levels for a small portion of the total number of frequencies available to a typical wireless system within a period during which channel and interference changes occur. Thus, current frequency management methods make replacement decisions by selecting high quality frequencies from among fewer than the total number of frequencies available to the system and make replacement decisions with insufficient knowledge of both the propagation medium and interference behavior. The ability to measure interference levels for all available system frequencies at a rate faster than once per second enables a frequency management method to take full advantage of the potential benefits of frequency hopping techniques by selecting best quality frequencies from among all system frequencies when attempting to reduce the impact of both propagation medium and interference influences on the quality of system frequencies.

Additionally, current frequency hop management methods do not eliminate the possibility that two interfering transmitters within the same system may respond to measured interference levels by simultaneously switching to the same high quality frequencies and again interfering with each other's transmissions.

In view of the above, it can be appreciated that there is a need for a method and apparatus that solves the above mentioned problems.

SUMMARY OF THE INVENTION

The present invention provides a method and apparatus for reducing interference in a frequency hopping wireless communication system. According to an embodiment of the present invention, a wideband transceiver and an orthogonal frequency division multiplexing (OFDM) technique are used to simultaneously measure an interference level for each system frequency. After simultaneously measuring interference levels for each system frequency using a base station and a terminal station communicating with the base station, the base station identifies a frequency hop pattern currently in use for each base station/terminal station communication link. The measured frequency interference levels are then used to identify each frequency hop pattern in which at least one of the current system frequencies should be replaced with a system frequency having a lower interference level. The base station then replaces no more than a predetermined number of the current system frequencies within the identified frequency hop pattern(s) with system frequencies having lower interference levels. The above steps are executed independently for uplink and downlink frequency hop patterns at each base station within the wireless system while ensuring that nearby mutually interfering base stations do not replace frequency hop pattern frequencies at the same time.

DETAILED DESCRIPTION

Figure 1:
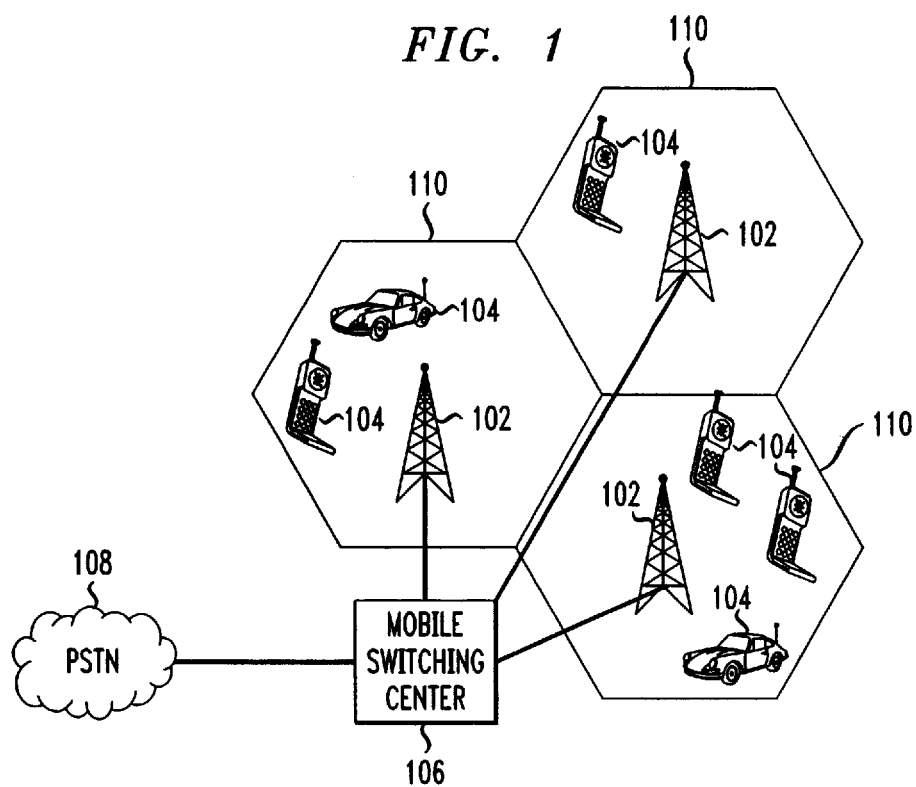
FIG. 1 illustrates a system suitable for practicing an embodiment of the present invention.

The present invention reduces interference levels within a frequency hopping wireless communication system by dynamically replacing system frequencies in use within selected frequency hopping patterns with system frequencies having lower interference levels and by precluding nearby mutually interfering system components (such as base stations) from simultaneously making frequency replacements using the same available system frequencies. FIG. 1 is a diagram of a system suitable for practicing an embodiment of the present invention. In FIG. 1, a geographic area served by a frequency hopping wireless communications system is divided into a plurality of cells 110. In this embodiment three hexagonal cells 110 are shown. The system can have more or less than three cells and the cells need not be hexagonal in shape. Each cell 110 includes a base station 102 and one or more terminal stations 104. Terminal stations 104 may be fixed or mobile. Each base station 102 and terminal station 104 is adapted to transmit and receive voice and/or data information using radio frequency signals.

Each base station 102 is adapted to be connected to a mobile switching center (MSC) 106. MSC 106 is adapted to be connected to a fixed network 108. Fixed network 108 may be, for example, a Public Switched Telephone Network (PSTN).

Each base station 102 may select from the entire set of radio frequencies available to the communications system for use in two-way communication with terminal stations 104 located within the geographic area of the cell 110 in which each base station 102 is located. Two-way communication between a base station 102 and a particular terminal station 104 within the same cell 110 is accomplished by sequentially modulating a set of system radio frequencies with voice and/or data information. The chronological sequence in which each frequency within the set is modulated with voice and/or data information is known as a frequency hop pattern. Each radio frequency within a given frequency hop pattern is modulated with voice and/or data information for a duration of time known as a frequency dwell.

Figure 2:
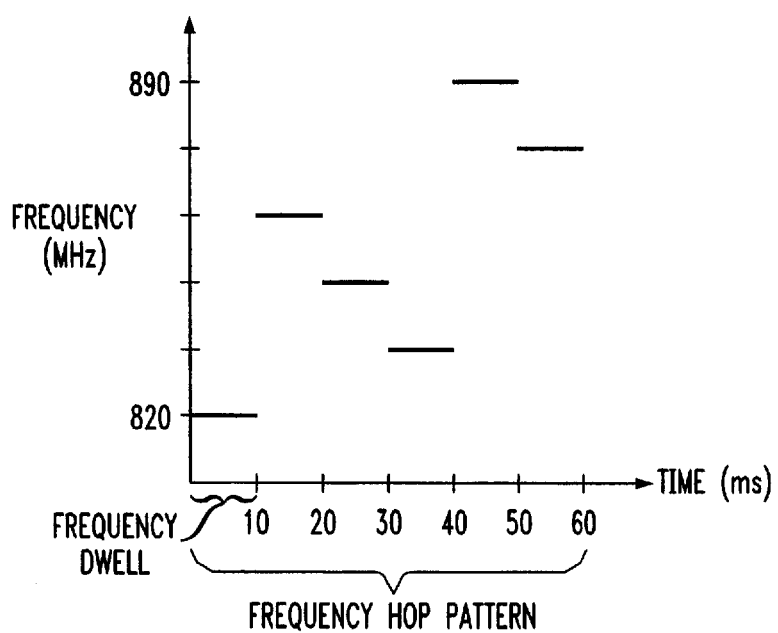
FIG. 2 illustrates an example of a frequency hop pattern composed of six frequency dwells.

FIG. 2 illustrates an example of a frequency hop pattern composed of six frequency dwells. In FIG. 2, time is incremented in milliseconds (ms) along the horizontal axis and frequency is incremented in megahertz (MHz) along the vertical axis. The frequency hop pattern of FIG. 2 repeats each 60 ms. Each frequency dwell within this frequency hop pattern has a duration of 10 ms. The system frequency in use during each frequency dwell of this frequency hop pattern may be determined using FIG. 2. For example, the 820 MHz system frequency is modulated with voice and/or data information during the first frequency dwell of this frequency hop pattern.

Each base station 102 in FIG. 1 controls which of the system radio frequencies are allocated to the frequency hop pattern used to communicate with each terminal station 104 within that base station's cell 110. First, the base station 102 selects the frequencies which will be used to communicate with a particular terminal station 104. The base station then informs the terminal station 104 of the selected frequencies by, for example, transmitting a message to that terminal station using predetermined designated control frequencies. Similarly, to preclude terminal stations 104 within the same cell from simultaneously transmitting voice and/or data information using the same frequency, each base station 102 controls the sequence of frequencies (i.e., which frequency is used during each frequency dwell) within the frequency hop patterns used by terminal stations 104 within that base station's cell 110.

Figure 3:
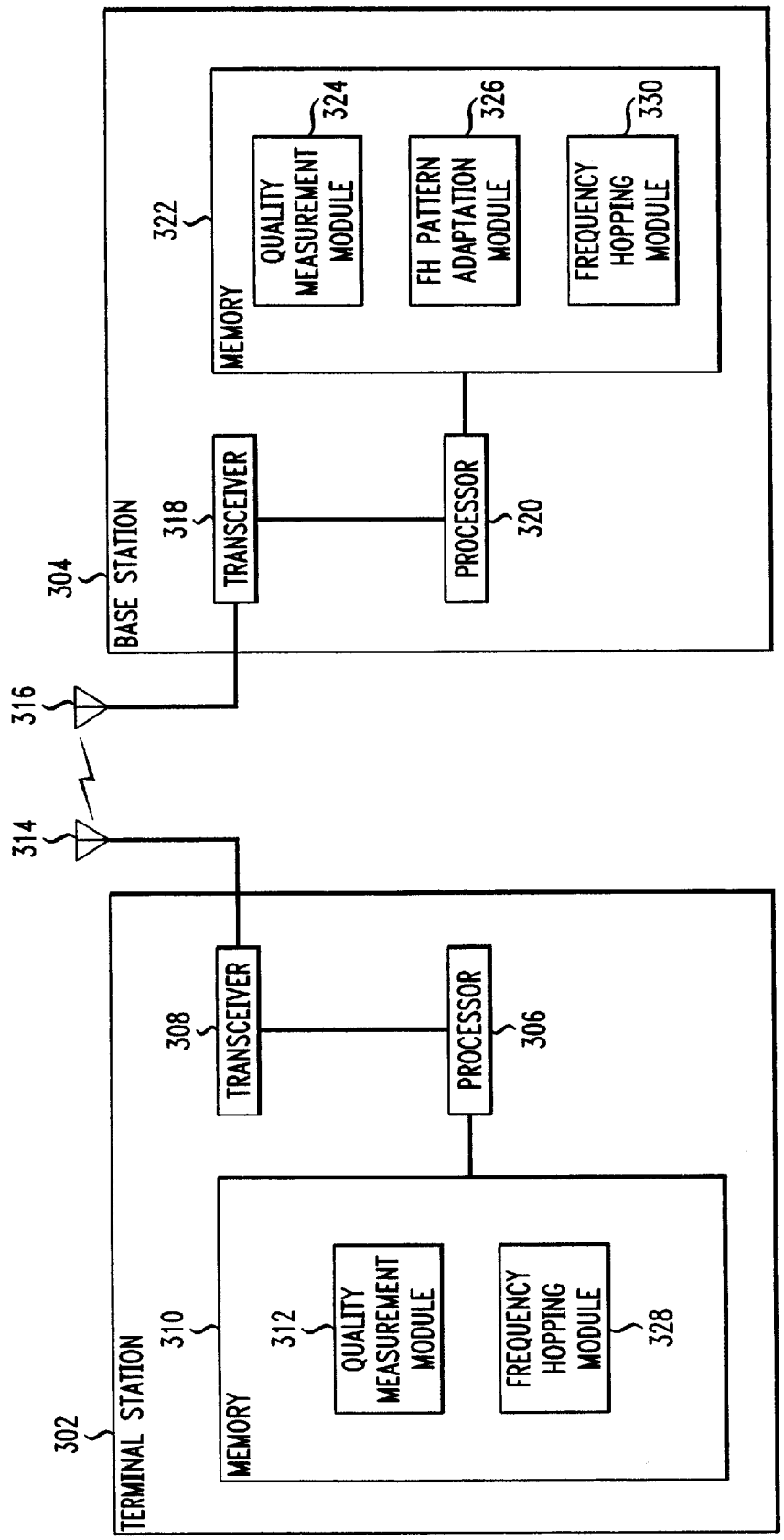
FIG. 3 illustrates a terminal station and a base station suitable for practicing an embodiment of the present invention.

FIG. 3 illustrates a terminal station and a base station suitable for practicing an embodiment of the present invention. Terminal station 302 is a known device, such as a cellular telephone, modified in accordance with the present invention. As illustrated in FIG. 3, terminal station 302 comprises a processor 306 adapted to be connected to a transceiver 308 and a computer readable memory 310. Transceiver 308 is adapted to be connected to an antenna 314.

Computer readable memory 310 stores computer program code segments which, when executed by processor 306 implement the main functionality for this embodiment of the invention. These computer program code segments are included within a quality measurement module 312 and a frequency hopping module 328. Although in this embodiment of the invention, the computer program code segments are shown in two modules, it can be appreciated that these modules can be further separated into more modules or combined into one module, and still fall within the scope of the invention.

Base station 304 is a known device modified in accordance with an embodiment of the present invention. As illustrated in FIG. 3, base station 304 comprises a processor 320 adapted to be connected to a computer readable memory 322 and a transceiver 318. Transceiver 318 is adapted to be connected to an antenna 316.

Computer readable memory 322 stores computer program code segments which, when executed by processor 320 implement the main functionality for this embodiment of the invention. These computer program code segments are included within three modules: a quality measurement module 324, a frequency hop pattern adaptation module 326, and a frequency hopping module 330. Although in this embodiment of the invention, the computer program code segments are shown in three modules, it can be appreciated that these module can be further separated into more modules or combined into one module, and still fall within the scope of the invention.

Figure 4:
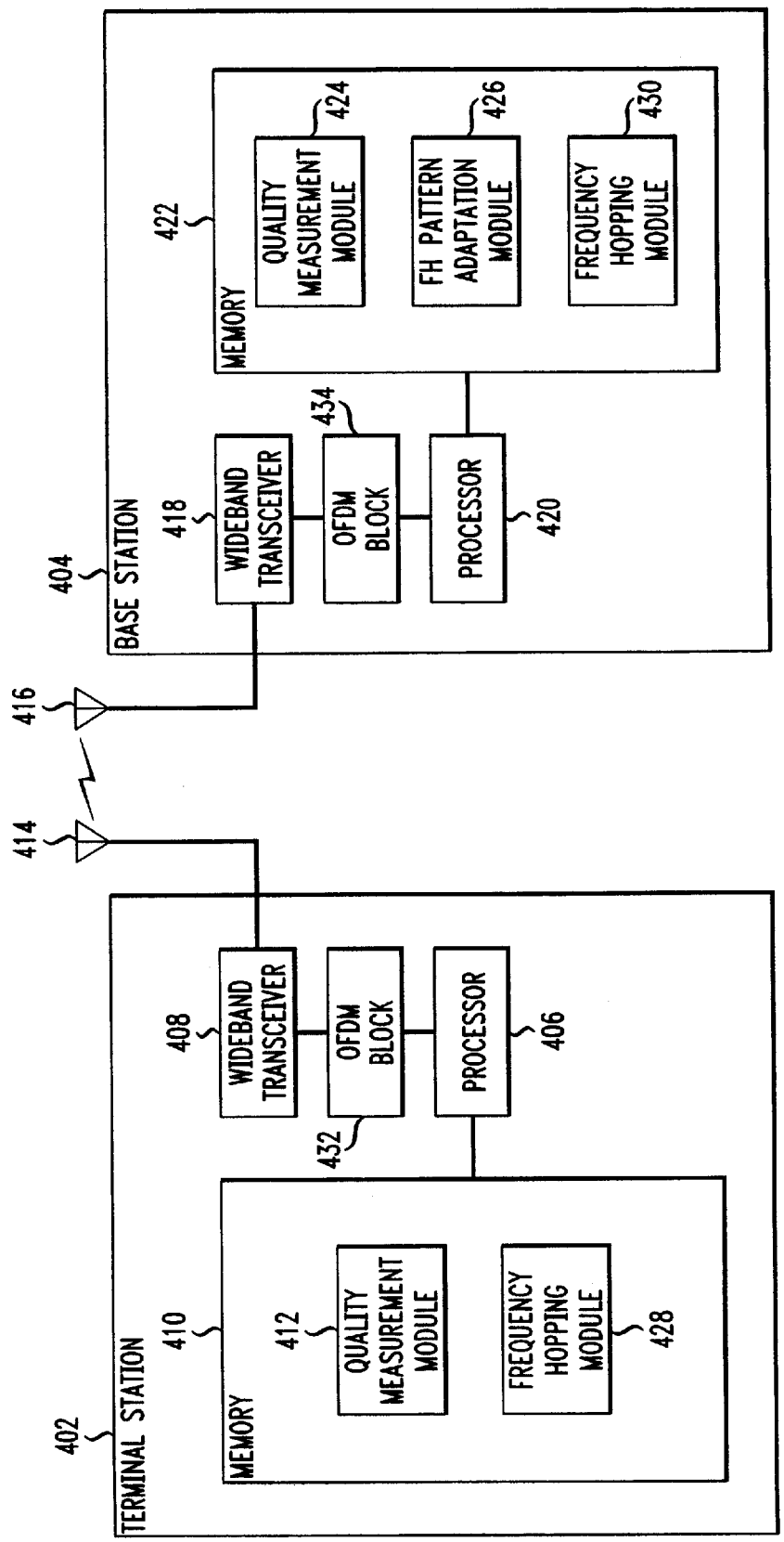
FIG. 4 illustrates the terminal station and base station of FIG. 3 modified to implement OFDM processing in hardware in accordance with one embodiment of the present invention.

By simultaneously (rather than sequentially) measuring an interference level for each system frequency, the method of the present invention obtains frequency interference level measurement values faster than current methods. In one embodiment of the present invention, simultaneous system frequency interference level measurements are rapidly obtained using a wideband transceiver and an OFDM technique. FIG. 4 illustrates the terminal station and base station of FIG. 3 modified to implement OFDM processing in hardware, in accordance with one embodiment of the present invention. Terminal station 402 includes a wideband transceiver 408 and an OFDM block 432 (described in greater detail below) in addition to the components described above with reference to terminal station 302 of FIG. 3. Similarly, Base station 404 includes a wideband transceiver 418 and an OFDM block 434 (described in greater detail below) in addition to the components described above with reference to terminal station 304 of FIG. 3.

Figure 5:
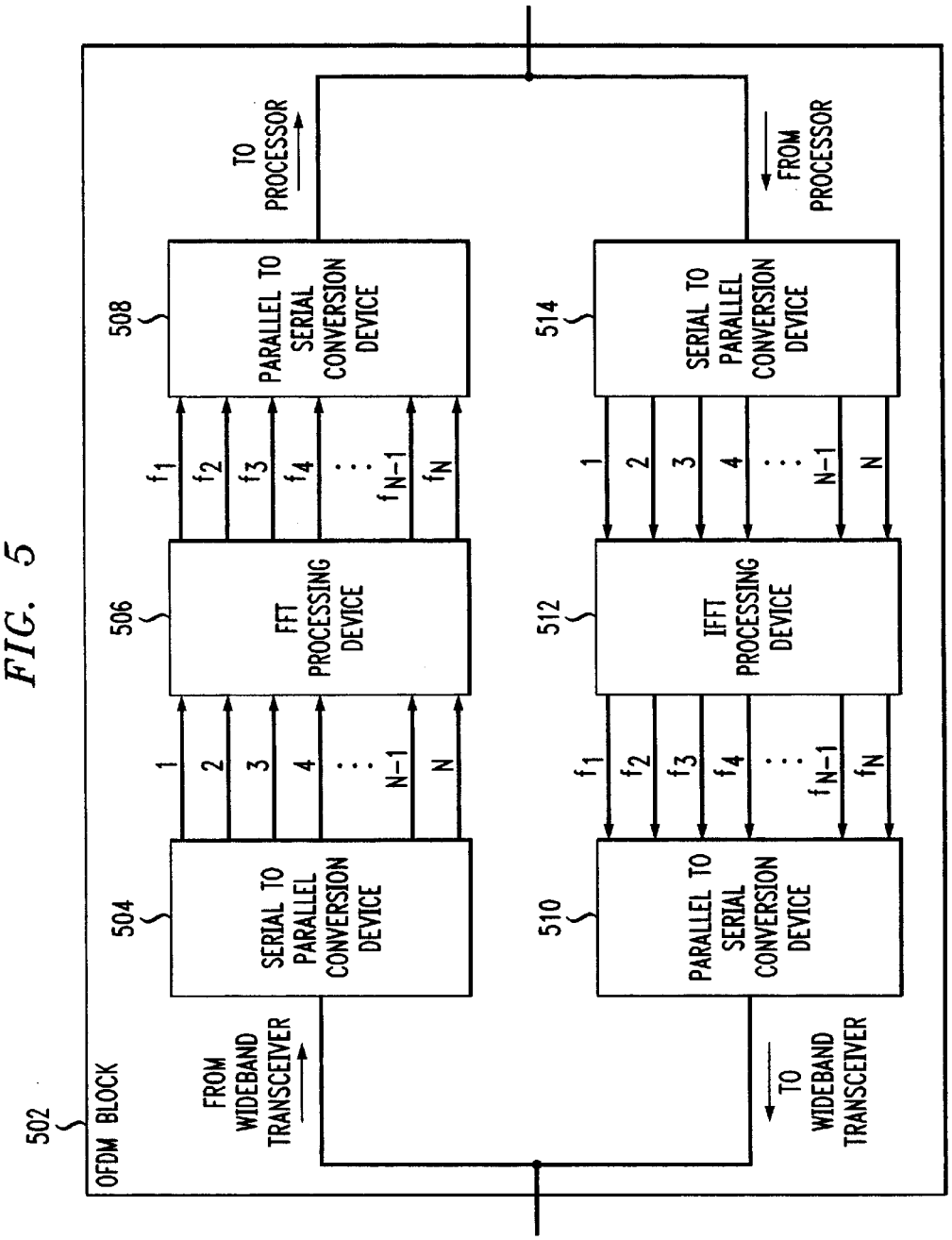
FIG. 5 illustrates an example of an OFDM block, in accordance with an embodiment of the present invention.

FIG. 5 illustrates an example of an OFDM block, in accordance with an embodiment of the present invention. In FIG. 5, an OFDM block 502 comprises a serial to parallel conversion device 504 adapted to receive an input signal from a wideband transceiver, such as wideband transceiver 408 or wideband transceiver 418 of FIG. 4. A fast Fourier transform (FFT) processing device 506 is adapted to receive "N" input signals from serial to parallel conversion device 504. A parallel to serial conversion device 508 is adapted to receiver "N" input signals from FFT processing device 506. Parallel to serial conversion device 508 is also adapted to send an output signal to a processor such as processor 406 or processor 420 of FIG. 4. OFDM block 502 also comprises a serial to parallel conversion device 514 adapted to receive an input signal from a processor such as processor 406 or processor 420 of FIG. 4. An inverse fast fourier transform (IFFT) device 512 is adapted to receive "N" input signals from serial to parallel conversion device 514. A parallel to serial conversion device 510 is adapted to receive "N" input signals from IFFT processing device 512. Parallel to serial conversion device 510 is also adapted to send an output signal to a wideband transceiver such as wideband transceiver 408 or wideband transceiver 418 of FIG. 4.

As mentioned previously terminal stations and base stations of the present invention are adapted to transmit and receive data. Thus, in one embodiment of the present invention, an OFDM block similar to that illustrated in FIG. 5 is included within each terminal station and each base station of the wireless communication system. To transmit data from terminal station 402 to base station 404, terminal station 402 provides a high bit rate data stream to an OFDM block within terminal station 402 such as OFDM block 502 illustrated in FIG. 5. Serial to parallel conversion device 514 receives the high bit rate data stream and uses this data stream to generate "N" parallel low bit rate data streams (where "N" is an integer value). The value of "N" is determined by the number of frequencies available to the wireless communication system. Serial to parallel conversion device 514 then sends these "N" parallel low bit rate data streams to IFFT processing device 512. IFFT processing device 512 uses each of the "N" parallel low bit rate data streams to modulate "N" different carrier frequencies and then converts each of these "N" frequency domain signals to "N" corresponding time domain signals. IFFT processing device 512 sends these "N" time domain signals to parallel to serial conversion device 510. Parallel to serial conversion device 510 uses the "N" time domain signals to generate a single signal comprised of a high bit rate serial stream of data and sends this high bit rate serial data stream signal to a wideband transceiver or a modulating device where the data stream is used to modulate a range of carrier frequencies available to the wireless communications system. The modulated signal is then transmitted through the air to base station 404.

Upon receiving the modulated high bit rate serial data stream signal, base station 404 may use either wideband transceiver 418 or another demodulating device to demodulate the high bit rate serial data stream signal from the carrier frequency. This high bit rate serial data stream signal is then sent to an OFDM block within base station 404 such as the OFDM block 502 illustrated in FIG. 5. Serial to parallel conversion device 504 receives the high bit rate serial data stream and converts this data stream to "N" parallel low bit rate data stream signals. These "N" parallel low bit rate data stream signals are then sent to FFT processing device 506. FFT processing device 506 uses the "N" parallel low bit rate data stream signals to generate "N" output signals, where "N" is the number of frequencies available to the communications system. Each system frequency is simultaneously represented by one output from FFT processing device 506. As described below, signals output from FFT processing device 506 are used to simultaneously determine the quality of each system frequency. In one embodiment, the quality of each system frequency is determined by comparing the relative amplitudes of each signal output from FFT processing device 506. If measurements are taken during a period in time when no terminal station is transmitting data using a particular system frequency, the output signal from FFT processing device 506 which corresponds to this particular signal may represent the value of interference at that frequency. Thus, the higher the amplitude of that FFT processing device 506 signal, the higher the interference level experienced at that particular frequency. Other methods for representing the quality of each system frequency such as a ratio of signal to noise may be obtained in a similar manner.

The parallel signals output from FFT processing device 506 are sent to parallel to serial conversion device 508. Parallel to serial processing device 508 uses these parallel signals to regenerate the high bit rate serial data stream which terminal station 402 sent to base station 404's OFDM block. Parallel to serial processing device 508 then sends this high bit rate serial data stream to processor 420 for further processing by base station 404. This further processing may entail sending the data stream to a PSTN through an MSC as illustrated in FIG. 1.

Figure 6:
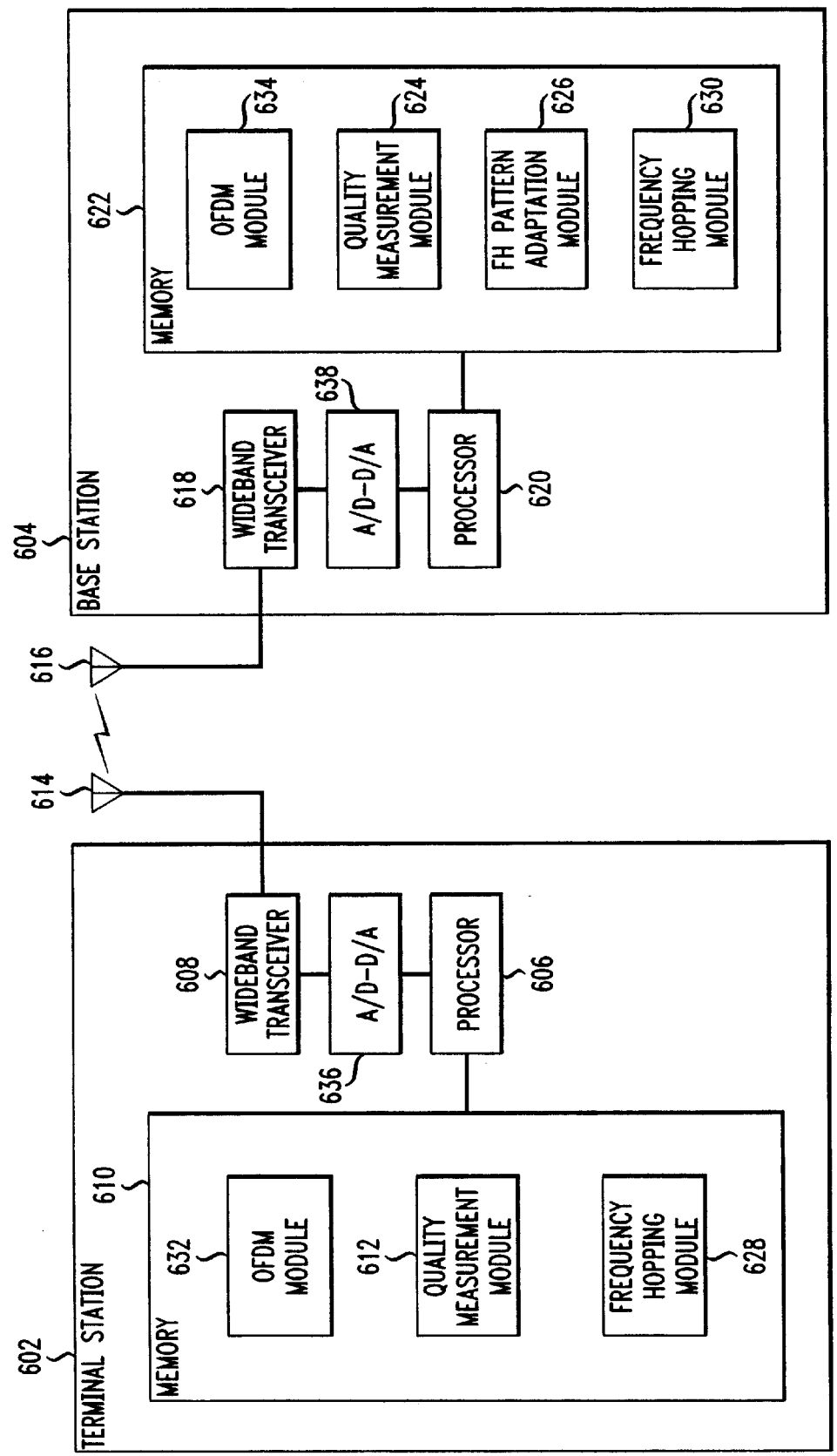
FIG. 6 illustrates the terminal station and base station of FIG. 3 modified to implement OFDM processing in software in accordance with one embodiment of the present invention.

OFDM processing may be implemented in hardware, as described above or in software. FIG. 6 illustrates the terminal station and base station of FIG. 3 modified to implement OFDM processing in software, in accordance with one embodiment of the present invention. Terminal station 602 includes a wideband transceiver 608, an analog to digital/digital to analog processing device 636, and an OFDM module 632 (described in greater detail below) in addition to the components described above with reference to terminal station 302 of FIG. 3. Similarly, base station 604 includes a wideband transceiver 618, an analog to digital/digital to analog processing device 638, and an OFDM module 634 in addition to the components described above with reference to base station 304 of FIG. 3. Both analog to digital/digital to analog processing devices 636 and 638 include components used to convert a received analog signal to a digital output signal (and vice versa) as appropriate. Analog to digital/digital to analog processing devices 636 and 638 transmit signals to and receive signals from OFDM modules 632 and 634 respectively via processors 606 and 620 respectively. OFDM modules 632 and 634 include computer program code segments (as described above with reference to FIG. 3) which implement OFDM signal processing in a manner similar to that described above with reference to FIG. 5.

For example, upon receiving a modulated signal from terminal station 602, base station 604 first demodulates the signal from the carrier frequency using wideband transceiver 618 or another demodulation device. The demodulated signal is then converted from analog form to a corresponding digital representation using analog to digital/digital to analog conversion device 638. The digital signal is then processed as described above with reference to FIG. 5 by using processor 620 to execute the computer program code segments within OFDM module 634. Similar steps are followed in reverse by base station 604 when transmitting data to terminal station 602.

Figure 7:
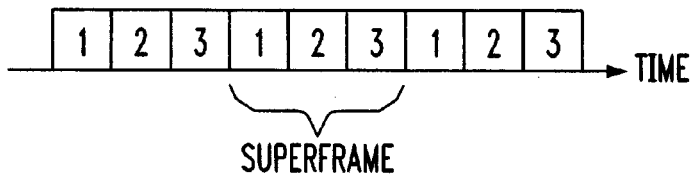
FIG. 7 illustrates a superframe in accordance with an embodiment of the present invention.

An example of the method of the present invention will now be described with reference to FIG. 1, FIG. 4 and FIG. 5. To initialize the system, each base station 102 is time synchronized using a system such as the Global Positioning System. (GPS). Once each base station 102 is time synchronized, a repeating time segment (referred to herein as a "superframe") is divided into three time segments known as frames and each base station 102 is assigned to a frame within the superframe. FIG. 7 illustrates a superframe in accordance with an embodiment of the present invention. The repeating superframe of FIG. 7 is divided into three frames.

Once base stations 102 are time synchronized, the following steps (explained below with reference to FIG. 4) are performed at each of the three base stations 102 of FIG. 1. For the purpose of this example, assume a plurality of terminal stations such as terminal station 402 illustrated in FIG. 4 are physically located within the geographic area of base station 404's cell. First, base station 404 uses quality measurement module 424 to obtain quality measurement values for each system frequency. These quality measurements may be obtained, for example, through processor 420 from a device such as OFDM block 434. More particularly, these measurements may be obtained from a device such as FFT processing device 506 (illustrated in FIG. 5) included within OFDM block 434. Each frequency is represented by an FFT output. In one embodiment, if a frequency was not being used for transmission during a time period when measurements are obtained from FFT module 506, all the energy observed at the output corresponding to that frequency represents the value of interference at that frequency. Thus, the higher the amplitude of the value received from FFT module 506, the higher the interference level for that frequency. In another embodiment, each output of FFT module 506 represents a ratio of the strength of the frequency signal to the noise level experienced by that frequency signal:

Either on a continuous basis or upon receiving a request from base station 404 each of the plurality of terminal stations 402 obtain quality measurements for all system frequencies available to the communications system. These measurements are accomplished in a manner similar to that described above. The plurality of terminal stations 402 then send their frequency quality measurements to base station 404. Using both the frequency quality measurements obtained by base station 404 and the frequency quality measurements received from the plurality of terminal stations 402, quality measurement module 424 determines a quality value for each system frequency and assigns a rank number to each system frequency based upon the determined quality values. The rank numbers associated with each system frequency increase as the quality value of each frequency decreases. This measurement and ranking is accomplished independently for uplink and downlink frequency hop patterns.

Quality measurement module 424 next retrieves the identity of each system frequency used in each frequency dwell of each frequency hop pattern used by each of the plurality of terminal stations 402. As mentioned previously, base station 404 controls and assigns the frequencies within the frequency hop patterns implemented by terminal stations 402 within base station 404's cell. Thus, this information may be retrieved from within computer readable memory 422. Next, quality measurement module 424 assigns the rank number to each frequency dwell which corresponds to the system frequency modulated during that frequency dwell.

Quality measurement module 424 then analyzes each frequency hop pattern using the rank information to identify terminal station frequency hop patterns in which one or more frequencies should be replaced with system frequencies having higher quality values (lower interference levels). This replacement information is then sent to frequency hop pattern adaptation module 426. Frequency hop pattern adaptation module 426 determines which frequencies should be replaced and informs frequency hopping module 430. Frequency hopping module 430 makes the appropriate frequency changes and uses processor 420 to transmit a message to frequency hopping module 428. This message instructs frequency hopping module 428 to make the same frequency changes. Frequency changes within frequency hop patterns also occur independently for uplink and downlink frequency hop patterns.

One method for analyzing the frequency hop patterns in use by terminal stations 402 communicating with base station 404 is referred to herein as the "mobile ranking method." The mobile ranking method entails first assigning a cumulative score to each terminal station. The cumulative score for a terminal station is obtained by summing the rank numbers (or the quality measurement values) assigned to the frequency dwells within that terminal station's frequency hop pattern. Each terminal station is then ranked according to the individually assigned cumulative scores. The terminal station with the worst (highest) cumulative score receives a new frequency hop pattern composed of the best quality frequencies available for each frequency dwell of that frequency hop pattern. The terminal station with the second worst score receives a new frequency hop pattern composed of the next best quality set of frequencies for each individual frequency dwell. This procedure is repeated until the terminal station with the lowest cumulative score receives a new frequency hop pattern composed of the remaining best quality frequencies. In the preferred embodiment, the total number of available system frequencies exceeds the number of frequencies required to assign one system frequency to each frequency dwell within each frequency hop pattern by such a margin that, during the mobile ranking method, the lowest quality frequencies will not be allocated to any frequency hop pattern.

In another embodiment of the present invention, the above frequency hop pattern analysis method is modified by comparing the cumulative score assigned to each terminal station to a predetermined threshold value. This analysis method is referred to herein as the "threshold based mobile ranking method." No frequency hop pattern reassignments are made for terminal stations having a cumulative score below the threshold value. The frequencies in use by those terminal stations with a cumulative score below the threshold value are not available for reassignment to terminal stations having a cumulative score higher than the threshold value. The terminal stations having cumulative scores above the threshold value are ranked according to their cumulative scores. The terminal station with the worst (highest) cumulative score receives a new frequency hop pattern composed of the remaining available best quality frequencies for each frequency dwell of that frequency hop pattern. The terminal station with the second worst score receives a new frequency hop pattern composed of the next remaining best quality set of frequencies. This procedure is repeated until the terminal station (from among the pool of terminal stations having a cumulative score above the threshold value) with the lowest cumulative score receives a new frequency hop pattern composed of the remaining best quality frequencies. In the preferred embodiment, the total number of available system frequencies exceeds the number of frequencies required to assign one system frequency to each frequency dwell within each frequency hop pattern by such a margin that, during the threshold based mobile ranking method, the lowest quality frequencies will not be allocated to any frequency hop pattern.

In another embodiment of the present invention, the frequency hop patterns in use by terminal stations 402 communicating with base station 404 are analyzed by identifying each frequency dwell which includes a frequency having a rank number in the higher end of the range of rank numbers. In accordance with this method, referred to herein as the "frequency dwell ranking method," frequencies with higher rank numbers are systematically replaced with frequencies having lower rank numbers. As a higher quality (lower rank number) frequency is used as a replacement, that frequency is removed from the pool of available replacement frequencies which may be used in that same frequency dwell by other terminal stations. Removing frequencies from the pool in this manner ensures no two terminal stations attempt to modulate the same frequency with voice and/or data information during simultaneously occurring frequency dwells.

In yet another embodiment of the present invention, an analysis method referred to herein as the "threshold based frequency dwell ranking method" is employed. In this embodiment, the rank of each frequency within each frequency dwell is compared to a predetermined threshold value. Frequencies having rank numbers below the threshold value remain in use during their current frequency dwell and are removed from the pool of available replacement system frequencies. Among the frequencies having rank numbers above the threshold value, the lowest quality frequencies are systematically replaced with the highest quality frequencies. As a higher quality frequency is used as a replacement, that frequency is removed from the pool of available replacement system frequencies which may be used in that same frequency dwell by other terminal stations. Removing frequencies from the pool in this manner ensures no two terminal stations attempt to modulate the same frequency with voice and/or data information during simultaneously occurring frequency dwells.

In yet another embodiment of the present invention, regardless of the frequency hop analysis method employed, the number of frequencies which may be replaced within any one frequency hop pattern is limited by a predetermined number.

There are some tradeoffs and advantages associated with choosing from among the above four analysis methods. The mobile ranking method may be implemented with the least complex algorithm. The threshold based mobile ranking method requires transmitting the fewest number of messages which alert other components of impending frequency changes. The frequency dwell ranking method results in the lowest interference levels within the system.

As mentioned previously, each of the three base stations 102 in FIG. 1 are assigned to a time frame within a superframe. In one embodiment of the present invention, each base station may only replace frequencies within frequency hop patterns during the frame to which that base station is assigned. This limitation helps reduce the probability that system interference levels will increase due to multiple base stations simultaneously switching to the same high quality system frequencies within simultaneously occurring frequency dwells.

Figure 8:
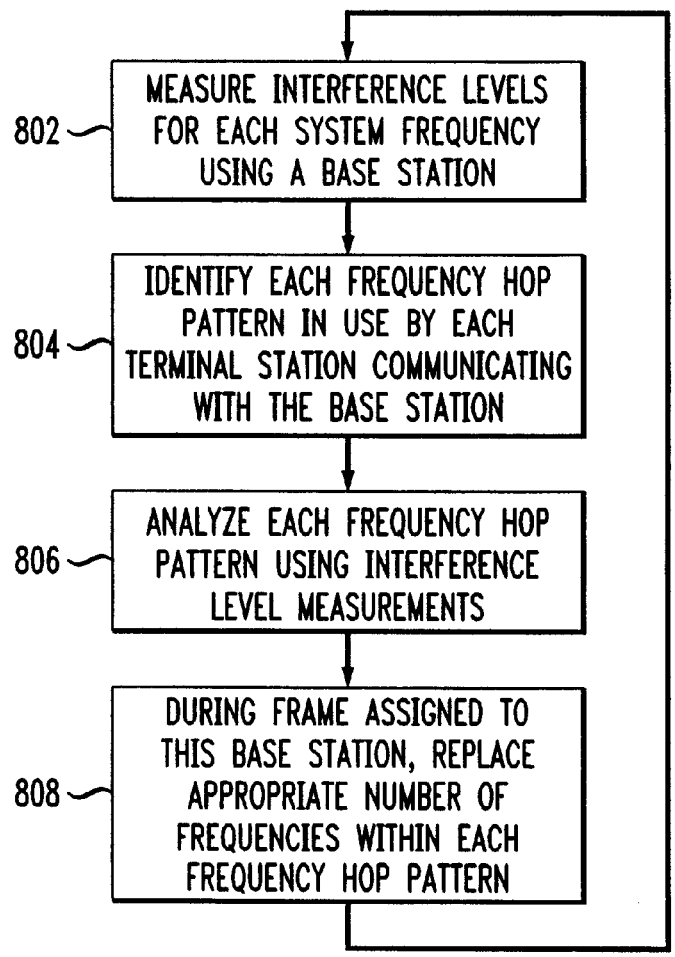
FIG. 8 is a flow chart illustrating an example of the steps for performing a method in accordance with an embodiment of the present invention.

FIG. 8 is a flow chart illustrating an example of the steps for reducing interference within a frequency hopping wireless communication system according to an embodiment of the present invention. The flow chart of FIG. 8 may be implemented, for example, as a computer program or as computer hardware using well-known signal processing techniques. If implemented in software, the computer program instructions may be stored in computer readable memory, such as Read-Only Memory (ROM), Random Access Memory (RAM), magnetic disk (e.g., 3.5" diskette or hard drive), and optical disk (e.g., CD-ROM). The stored programs may be executed, for example, by a general purpose computer which includes a processor. More particularly, the steps illustrated in FIG. 8 may be included within quality measurement module 424 and frequency hop pattern adaptation module 426 illustrated in FIG. 4.

In step 802, a base station simultaneously determines a quality value for each frequency available to the wireless communication system and ranks each system frequency as described above. These quality values may be determined using measurements obtained using OFDM methods implemented by both a base station and one or more terminal stations geographically located within the base station's cell (as described above) or may be obtained using OFDM methods implemented by only a base station. In step 804, the base station identifies each frequency hop pattern in use by each terminal station currently communicating with this particular base station. In step 806, the base station analyzes each frequency within each identified frequency hop pattern to ascertain those frequencies which should be replaced with system frequencies having a lower interference value. This step may be executed, for example, in accordance with one of the four above described analysis methods. In step 808, during the appropriate frame of a superframe, this particular base station replaces the ascertained frequencies. The system executes steps 802–808 at each base station within the wireless communications system. This procedure is executed independently for uplink and downlink.

Although several embodiments are specifically illustrated herein, it will be appreciated that modifications and variations of the present invention are covered by the above teachings and within the purview of the appended claims without departing from the spirit and intended scope of the invention. For example, although the method of the present invention is described in the context of using OFDM processing techniques, other techniques may also be used to simultaneously obtain interference level measurements for each system frequency.

What is claimed is:

1. A method of determining a measure of an interference level at each frequency in a plurality of system frequencies available to a multichannel wireless communication system, comprising:

receiving, at a base station, a plurality of measured values representative of an interference level at each frequency in the plurality of system frequencies available to the base station of the multichannel wireless communication system, wherein the interference levels were measured simultaneously;

measuring, simultaneously, at the base station, an interference level at each frequency in the plurality of system frequencies; and calculating a quality value for each frequency in the plurality of system frequencies using both the interference levels received at the base station and the interference levels measured at the base station.

2. The method of claim 1, wherein receiving occurs one of after a request issued from the base station and continuously.

3. The method of claim 1, wherein measuring is accomplished using orthogonal frequency division multiplexing (OFDM).

4. A method for reducing interference in a frequency hopping wireless communication system comprising a plurality of base stations each adapted to communicate with one or more of a plurality of terminal stations by transmitting one or more of a plurality of system frequencies through a propagation medium, the method comprising the steps of:

measuring, simultaneously, an interference level for each system frequency; and transmitting values representing said measured interference levels through the propagation medium to a base station.

5. The method of claim 4, wherein said measuring step is accomplished using orthogonal frequency division multiplexing (OFDM).

6. A computer-readable medium whose contents cause a computer system to reduce interference in a wireless communications system comprising a plurality of base stations each adapted to communicate with one or more of a plurality of terminal stations by transmitting one or more of a plurality of system frequencies through a propagation medium, the computer-readable medium performing the steps of:

measuring, simultaneously, an interference level for each system frequency; and transmitting values representing said measured interference levels through the propagation medium to a base station.

7. The computer-readable medium of claim 6, wherein said measuring step is accomplished using orthogonal frequency division multiplexing (OFDM).

* * * * *